US010429019B2

(12) United States Patent
Nankil

(10) Patent No.: US 10,429,019 B2
(45) Date of Patent: Oct. 1, 2019

(54) LIGHT FIXTURE WITH SHIELDED OPTIC

(71) Applicant: Hubbell Incorporated, Shelton, CT (US)

(72) Inventor: Robert R. Nankil, Fullerton, CA (US)

(73) Assignee: Hubbell Incorporated, Shelton, CT (US)

( * ) Notice: Subject to any disclaimer, the term of this patent is extended or adjusted under 35 U.S.C. 154(b) by 46 days.

(21) Appl. No.: 15/408,853

(22) Filed: Jan. 18, 2017

(65) Prior Publication Data

US 2017/0205038 A1 Jul. 20, 2017

Related U.S. Application Data

(60) Provisional application No. 62/280,288, filed on Jan. 19, 2016.

(51) Int. Cl.

| | |
|---|---|
| ***B60Q 1/26*** | (2006.01) |
| ***F21S 8/08*** | (2006.01) |
| *F21Y 115/10* | (2016.01) |
| *F21W 131/10* | (2006.01) |
| *F21Y 113/00* | (2016.01) |

(52) U.S. Cl.

CPC ............... *F21S 8/081* (2013.01); *F21S 8/088* (2013.01); *F21W 2131/10* (2013.01); *F21Y 2113/00* (2013.01); *F21Y 2115/10* (2016.08)

(58) Field of Classification Search

CPC ............ F21Y 2103/30; F21W 2111/02; F21W 2111/023; F21W 2111/027; F21W 2111/08; F21W 2131/103; F21S 8/043; F21S 8/046; F21S 8/065; F21S 6/002; F21S 6/003; F21S 6/005; F21S 6/006; F21S 6/008; F21S 4/20; F21S 4/22; F21V 14/04; F21V 14/045; F21V 14/06; F21V 14/065; F21V 14/08

See application file for complete search history.

(56) References Cited

U.S. PATENT DOCUMENTS

| | | | | |
|---|---|---|---|---|
| D549,362 S | 8/2007 | To | | |
| D577,133 S | 9/2008 | Xu | | |
| D597,227 S | 7/2009 | Kim | | |
| D613,432 S | 4/2010 | Chen | | |
| D616,130 S | 5/2010 | Tortel | | |
| D620,169 S | 7/2010 | Schwartz | | |
| 7,832,892 B2 * | 11/2010 | Xiao | ...................... | F21S 8/086 362/145 |

(Continued)

OTHER PUBLICATIONS

Merriam-Webster, "Helix" 2019, Merriam-Webster Dictionary (Year: 2019).*

(Continued)

*Primary Examiner* — Matthew J. Peerce
(74) *Attorney, Agent, or Firm* — Michael Best & Friedrich, LLP

(57) ABSTRACT

A light fixture includes at least one elongated strut and a socket formed on each strut. Each strut includes a first end, a second end, and an arcuate portion extending between the first end and the second end. An axis extends between the first end and the second end. The arcuate portion extending at least partially around the axis. The socket includes a ridge and a surface supporting a first light-emitting element. The surface is recessed relative to the ridge such that the light emitted by the light-emitting element is directed at an acute angle relative to the axis.

18 Claims, 11 Drawing Sheets

(56) References Cited

U.S. PATENT DOCUMENTS

| | | | |
|---|---|---|---|
| D634,455 | S | 3/2011 | Graf |
| D638,974 | S | 5/2011 | Fuksas |
| D642,723 | S | 8/2011 | Zheng |
| D655,435 | S | 3/2012 | Howis |
| D658,788 | S | 5/2012 | Dudik |
| D713,082 | S | 9/2014 | Hermanseon |
| 9,109,787 | B2 | 8/2015 | Nankil |
| D741,514 | S | 10/2015 | Bukkems |
| D742,558 | S | 11/2015 | Bukkems |
| D745,991 | S | 12/2015 | Duquette |
| D752,268 | S | 3/2016 | Paz |
| D752,269 | S | 3/2016 | Paz |
| D774,232 | S | 12/2016 | Nankil |
| D774,243 | S | 12/2016 | Nankil |
| 2002/0191396 | A1 | 12/2002 | Reiff |
| 2005/0030753 | A1 | 2/2005 | Tickner et al. |
| 2006/0198152 | A1 | 9/2006 | Wechsler |
| 2008/0074279 | A1 | 3/2008 | Chiu |
| 2009/0296368 | A1 | 12/2009 | Ramer |
| 2009/0323342 | A1* | 12/2009 | Liu ........................... F21K 9/00 362/249.02 |
| 2011/0228517 | A1 | 9/2011 | Kawabat et al. |
| 2012/0026732 | A1 | 2/2012 | Fricke |
| 2014/0268771 | A1* | 9/2014 | Heikman .............. F21V 29/004 362/249.02 |
| 2015/0285472 | A1* | 10/2015 | Evitt ..................... F21V 17/007 362/224 |
| 2015/0330609 | A1 | 11/2015 | Ahrari et al. |
| 2016/0061393 | A1* | 3/2016 | Ngai ....................... F21S 6/003 362/33 |

OTHER PUBLICATIONS

International Search Report and Written Opinion for Application No. PCT/US2017/013898 dated Mar. 31, 2017 (11 pages).

Will Stone, “Custom LED Spiral Staircase Lighting”, Makezine, Dec. 18, 2012, https://makezine.com/projects/custom-led-spiral-staircase-lighting/.

* cited by examiner

LIGHT FIXTURE WITH SHIELDED OPTIC

CROSS-REFERENCE TO RELATED APPLICATIONS

This application claims the benefit of prior-filed, U.S. Provisional Patent Application No. 62/280,288, filed Jan. 19, 2016, the entire contents of which are hereby incorporated by reference.

BACKGROUND

The present application relates to light fixtures, and particularly to light fixtures with a directional light distribution.

SUMMARY

Conventional light fixtures include one or more light-emitting elements. These light-emitting elements may include a light-emitting diode or LED. The light-emitting elements may be secured to the fixture in a specific orientation such that the emitted light is distributed asymmetrically.

In one aspect, a light fixture includes at least one elongated strut, at least one first socket, and at least one second socket. Each first socket is formed on one of the at least one struts, and each second socket is formed on one of the at least one struts. Each strut includes a first end, a second end, and an arcuate portion extending between the first end and the second end. An axis extends between the first end and the second end, and the arcuate portion extends at least partially around the axis. The first socket is spaced apart from the second end of the strut by a first distance, and the first socket supports a first light-emitting element. The second socket is spaced apart from the second end of the strut by a second distance greater than the first distance, and the second socket supports a second light-emitting element. The second light-emitting element emits light along a plane that is offset in a direction parallel to the axis from the light emitted by the first light-emitting element.

In another aspect, a light fixture includes at least one elongated strut and a socket formed on each strut. Each strut includes a first end, a second end, and an arcuate portion extending between the first end and the second end. An axis extends between the first end and the second end. The arcuate portion extending at least partially around the axis. The socket includes a ridge and a surface supporting a first light-emitting element. The surface is recessed relative to the ridge such that the light emitted by the light-emitting element is directed at an acute angle relative to the axis.

Other aspects of the application will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

FIGS. 1-5 illustrate a luminaire or light fixture 10. In the illustrated embodiment, the light fixture 10 is supported on an upper end of a post or pole 14 (FIG. 1) and the light fixture 10 emits light to illuminate an area of the ground around the base of the pole 14. In other embodiments, the light fixture 10 may be mounted in a different manner.

Figure 1:
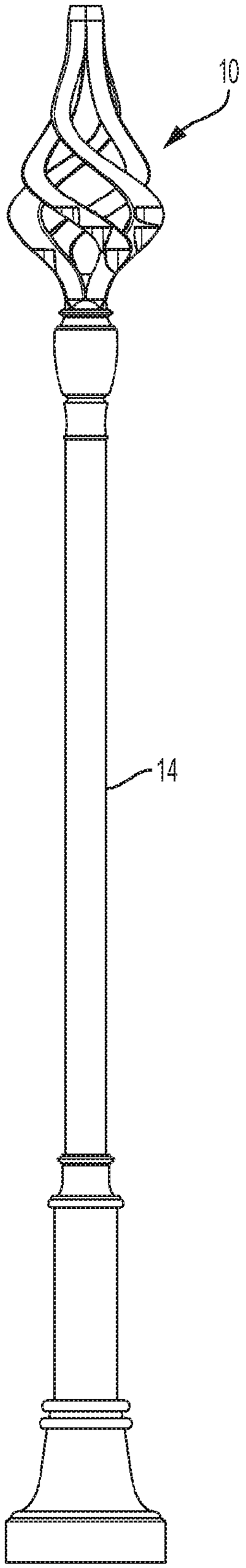
FIG. 1 is a side view of a light fixture secured to a pole.
Figure 2:
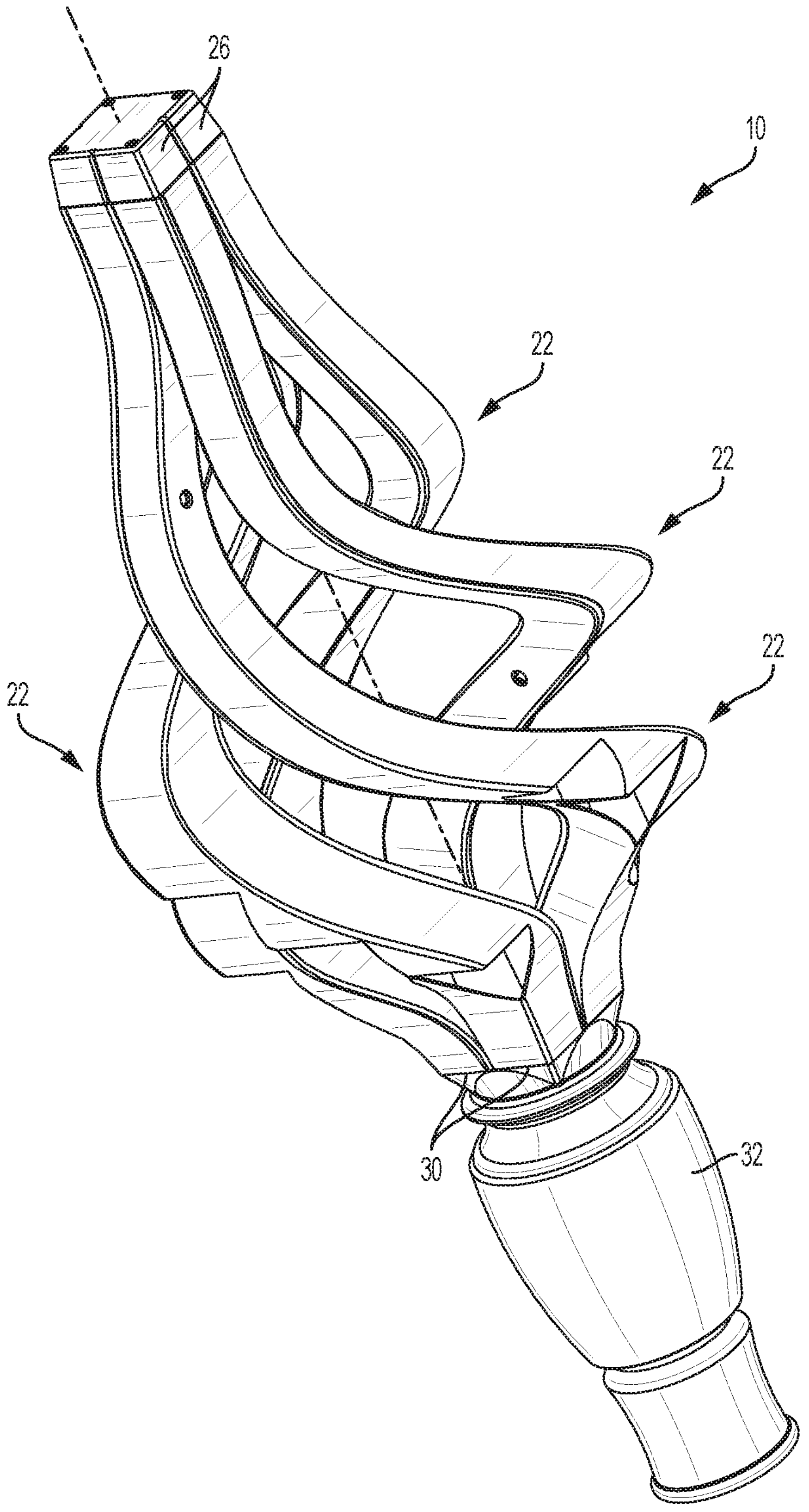
FIG. 2 is a perspective view of the light fixture of FIG. 1.
Figure 3:
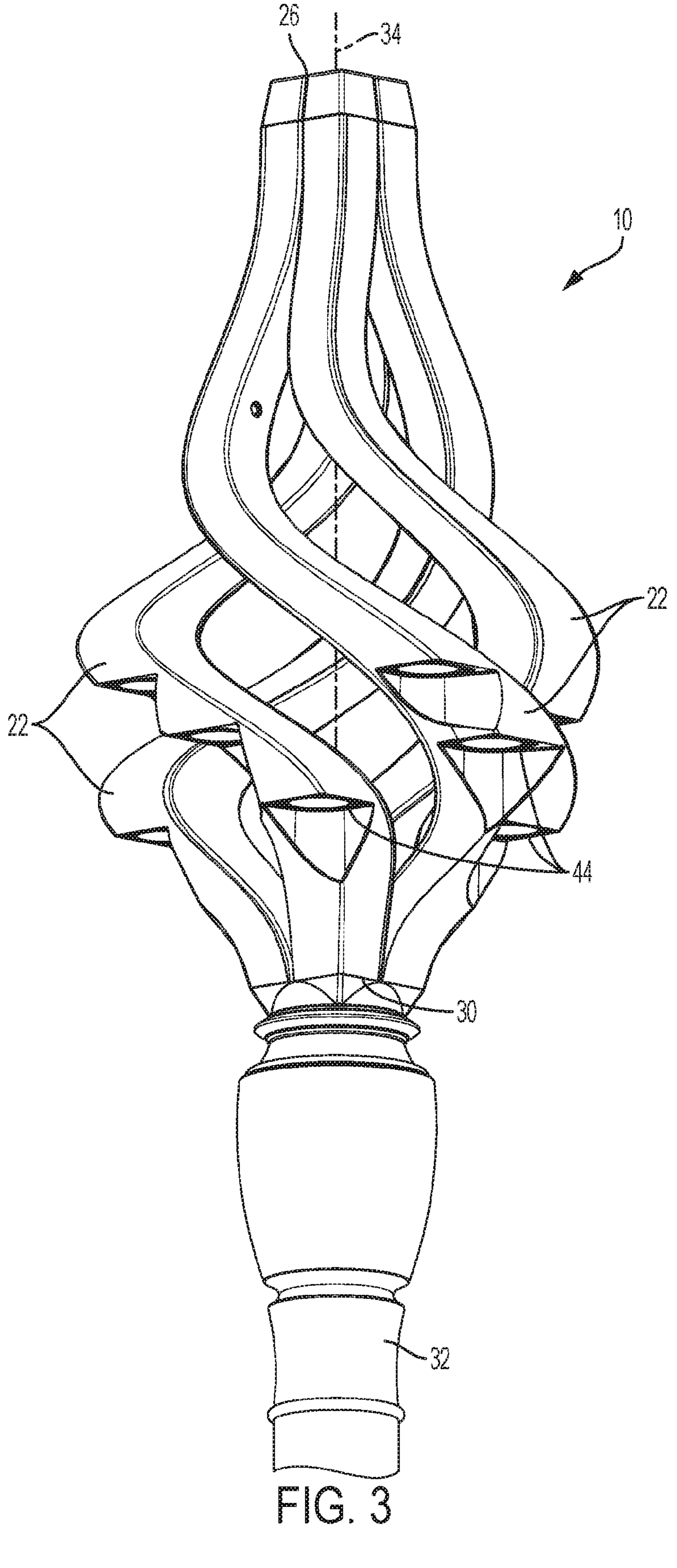
FIG. 3 is a second perspective view of the light fixture of FIG. 1.

As shown in FIGS. 2 and 3, the light fixture 10 includes multiple helical strands or struts 22, and each strut 22 includes a first or upper end 26 and a second or lower end 30. The upper ends 26 of the struts 22 are positioned adjacent one another, and the lower ends 30 of the struts 22 are positioned adjacent one another on a base 32. In the illustrated embodiments, the upper ends 26 of the struts 22 are coupled to a common cap. A fixture axis 34 extends between the upper ends 26 and the lower ends 30. For purposes of this description, the terms "axial" and "axially" refer to a direction that is parallel to the fixture axis 34, and the terms "radial" and "radially" refer to a direction that is perpendicular to the fixture axis 34. An axial distance between the upper ends 26 and the lower ends 30 defines a height of the fixture.

An intermediate portion of each strut 22 between the upper end 26 and the lower end 30 forms a spiral or helical shape extending radially outwardly from the fixture axis 34 and extending partially around the fixture axis 34. In the illustrated embodiment, each strut 22 extends approximately 180 degrees about the fixture axis 34. In other embodiments, each strut 22 may extend through an angle of fewer or more than 180 degrees about the axis 34. In some embodiments, each strut 22 may extend completely around the axis 34, or each strut 22 may extend more than 360 degrees about the axis 34. In the illustrated embodiment, the fixture 10 includes four struts 22; in other embodiments, the fixture may include fewer or more struts. A fixture radius is defined between the axis 34 and the radial outer surface of the struts 22. The fixture radius is largest (and the fixture 10 is therefore widest) at an intermediate portion at which the portion of each strut 22 is furthest from the axis 34). In the illustrated embodiment, the fixture radius varies in magnitude along the fixture axis 34.

A space or void is centered on the axis 34 and is formed between the intermediate portions of the struts 22. Stated another way, the space is somewhat enclosed by the struts 22, although the space is accessible via gaps between the struts 22. The space provides an open physical structure that allows both light and air to travel through the portion of the fixture 10 containing the light elements.

Figure 4:
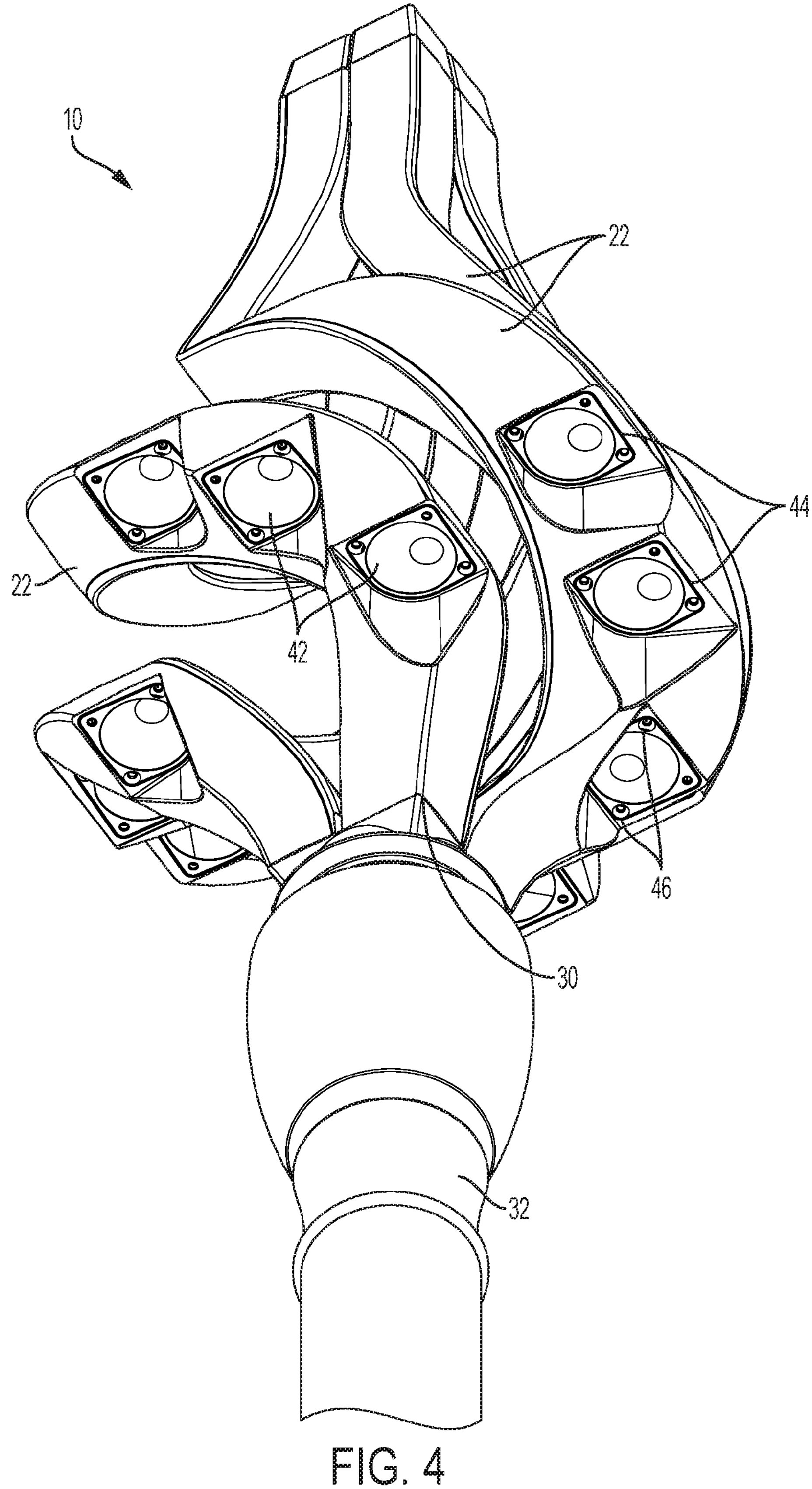
FIG. 4 is a lower perspective view of the light fixture of FIG. 1.
Figure 5:
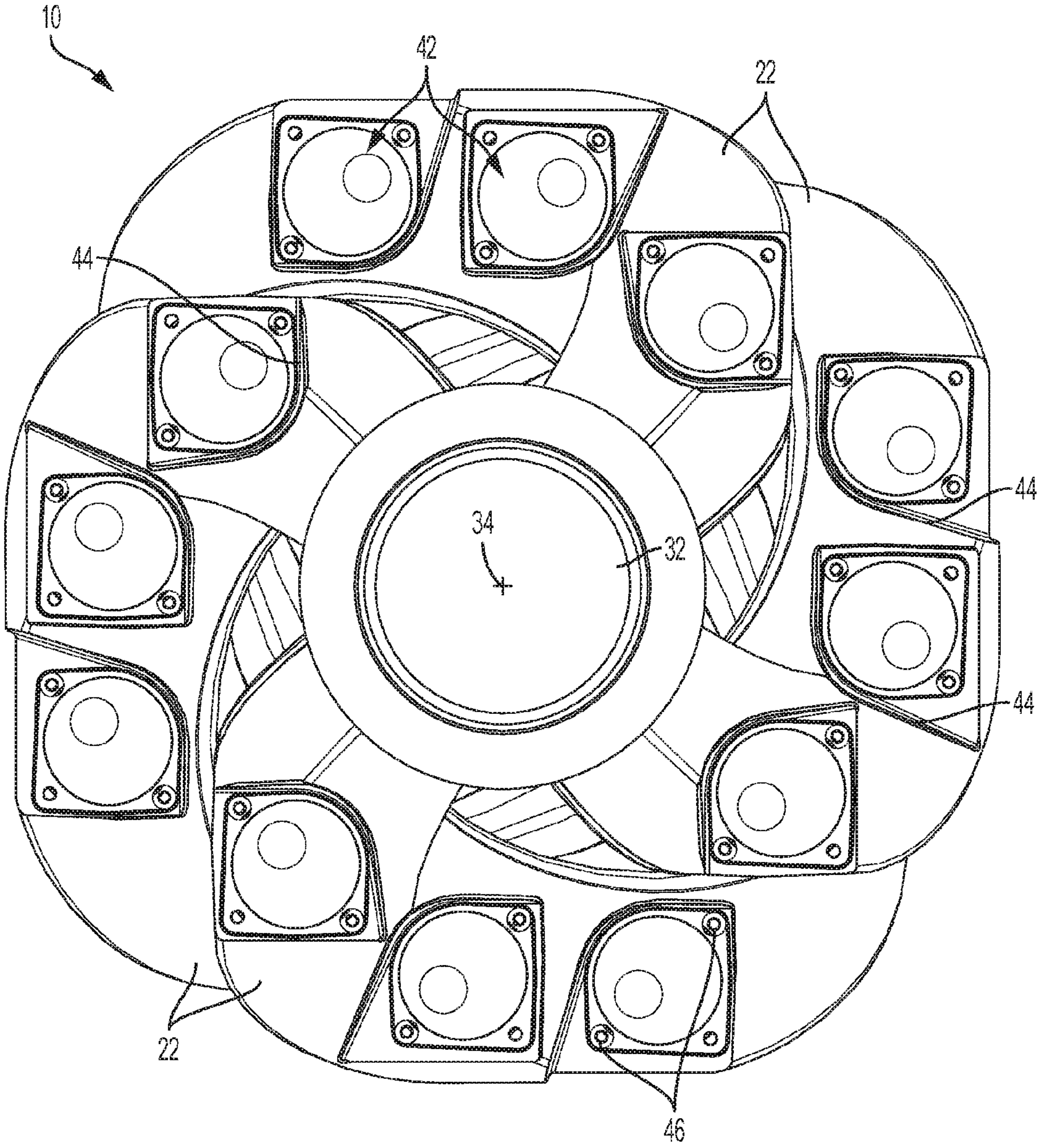
FIG. 5 is a bottom view of the light fixture of FIG. 1.

As shown in FIGS. 4 and 5, a portion of each strut 22 includes multiple light modules 42 and multiple sockets 44. Each light module 42 is secured within one of the sockets 44. In the illustrated embodiment, each strut 22 includes three light modules 42 and three sockets 44, and the modules on each strut 22 are offset from one another both along the fixture axis 34 (e.g., vertically) and angularly about the fixture axis 34 (FIG. 5). In some embodiments, at least some of the modules 42 are also offset radially with respect to the fixture axis 34 such that some modules are positioned closer to the axis 34 than others. In the illustrated embodiment, each light module 42 has a circular shape and may be secured within the socket 44 by fasteners 46. In some embodiments, each light module 42 may include four light-emitting elements (e.g., light-emitting diodes or LEDs). The light-emitting elements may be positioned in a cross or diamond configuration.

Figure 6:
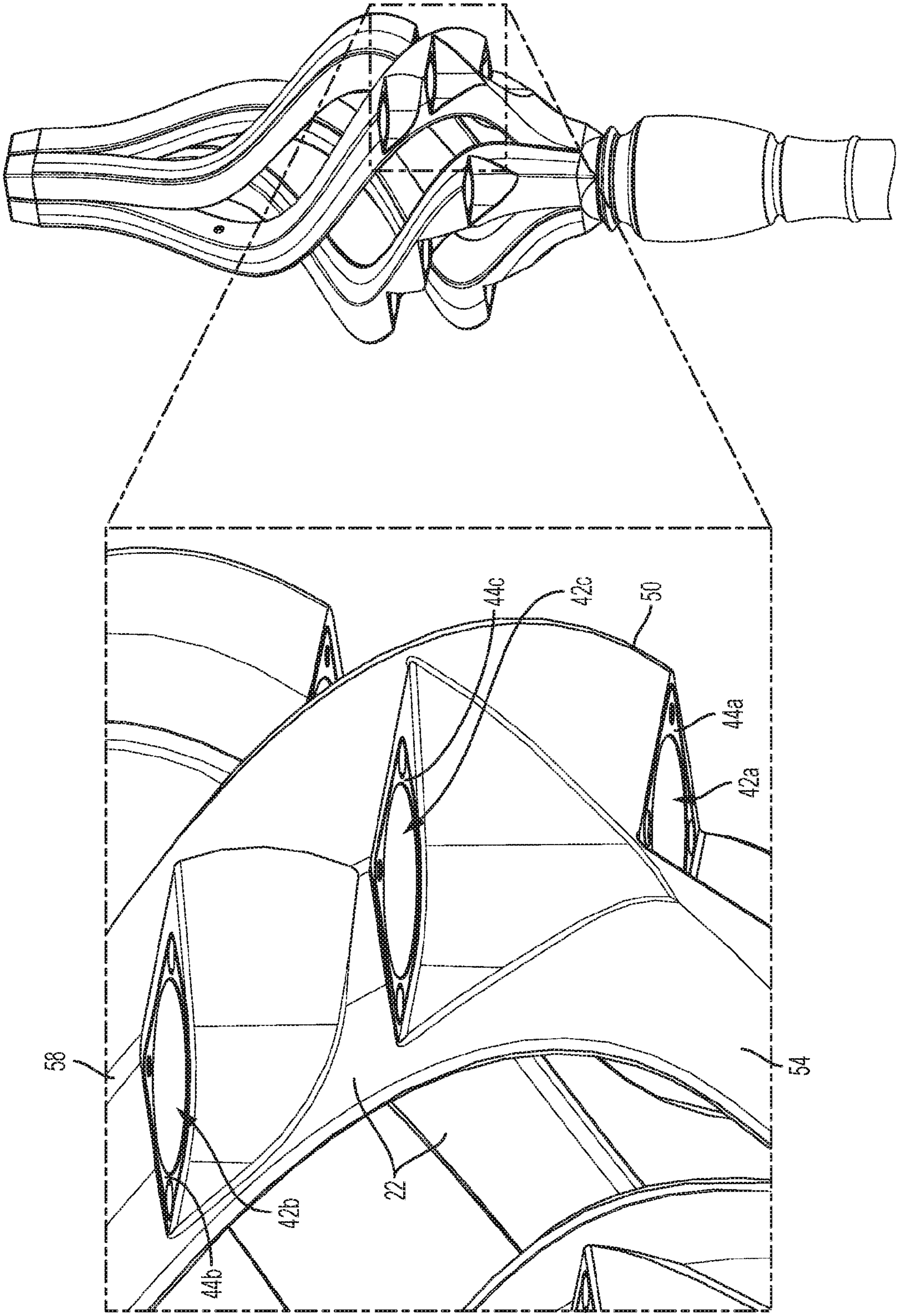
FIG. 6 is an enlarged side view of the light fixture of FIG. 1.
Figure 7:
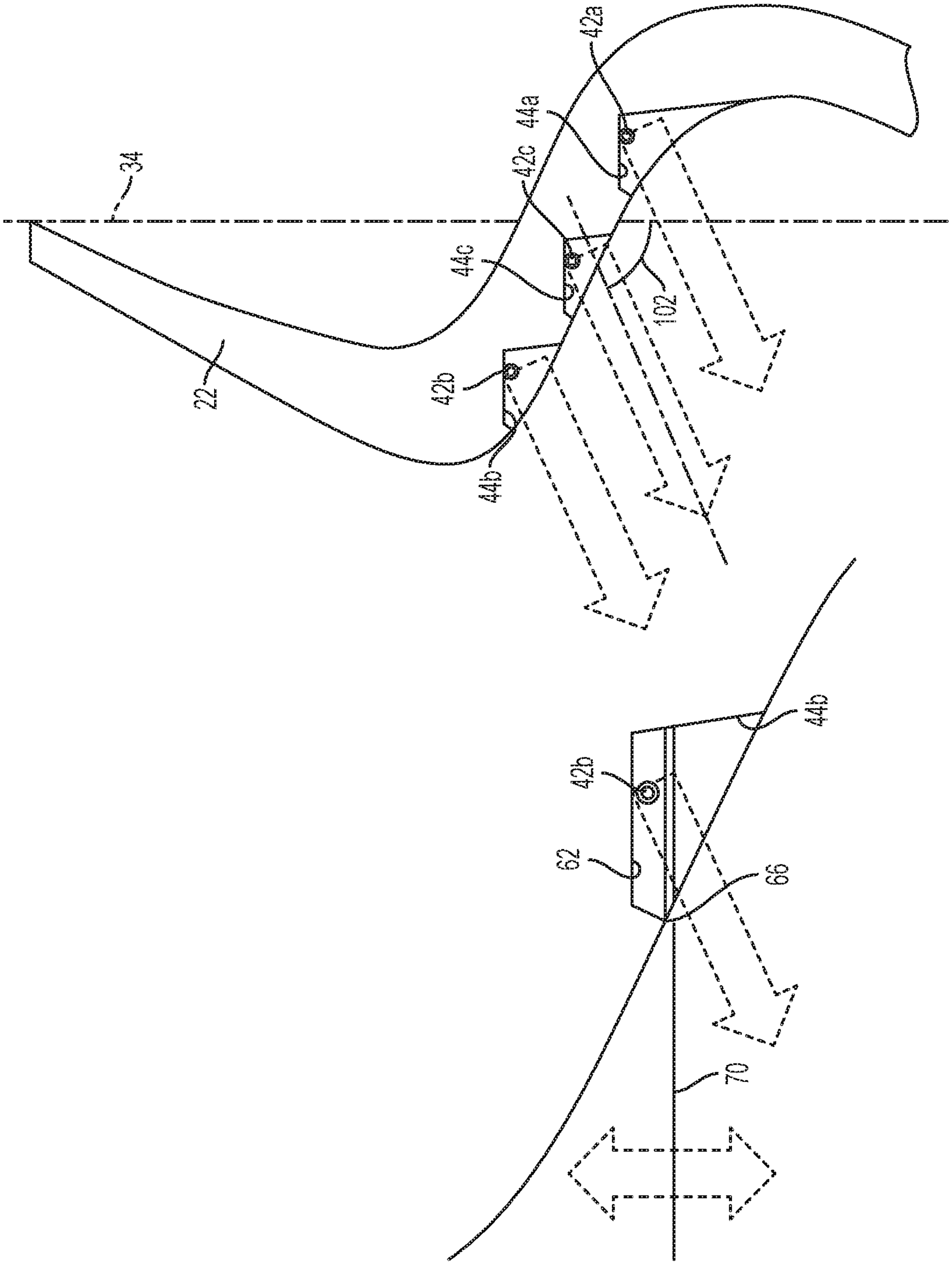
FIG. 7 is a side view of a portion of the light fixture of FIG. 1.
Figure 8:
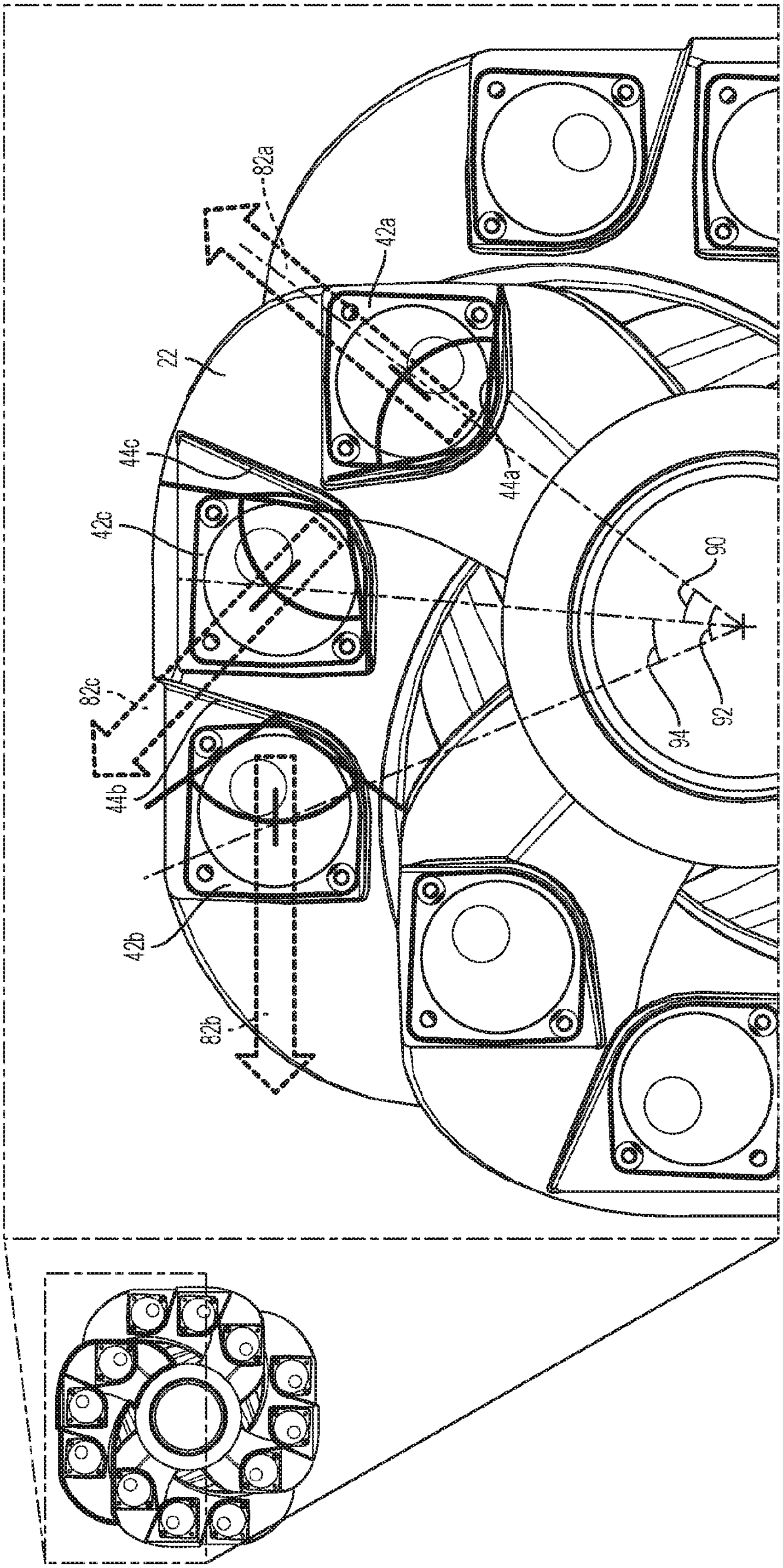
FIG. 8 is an enlarged bottom view of the light fixture of FIG. 1.

FIGS. 6-8 illustrate the sockets 44 and light modules 42 for an individual strut 22. As shown in FIG. 6, a first socket 44*a* is formed along an edge 50 joining two surfaces of the strut 22 and is positioned proximate the base 32. A second socket 44*b* is formed on a lateral surface 54 of the strut 22 along another edge 58 of the strut, and is positioned proximate the upper end 26. In the illustrated embodiment, the second socket 44*b* is positioned approximately halfway between the upper end 26 and the lower end 30 of the strut 22. A third socket 44*c* is formed along the edge 58 between the lateral surface 54 and another surface positioned between the edges 50 and 58. The third socket 44*c* is positioned axially between the first socket 44*a* and the second socket 44*b*. The sockets 44*a*, 44*b*, 44*c* are offset from one another along the axis 34.

In some embodiments, a distance between first socket 44*a* and the lower end 30 of the strut 22 is between approximately 10% and approximately 30% of the fixture height. In some embodiments, the distance between the first socket 44*a* and the lower end 30 of the strut 22 is between approximately 15% and approximately 25% of the fixture height. In some embodiments, the distance between the first socket 44*a* and the lower end 30 of the strut 22 is approximately 19% of the fixture height.

In some embodiments, a distance between second socket 44*b* and the lower end 30 of the strut 22 is between approximately 25% and approximately 45% of the fixture height. In some embodiments, the distance between the second socket 44*b* and the lower end 30 of the strut 22 is between approximately 30% and approximately 40% of the fixture height. In some embodiments, the distance between the second socket 44*a* and the lower end 30 of the strut 22 is approximately 35.7% of the fixture height.

In some embodiments, a distance between third socket 44*c* and the lower end 30 of the strut 22 is between approximately 20% and approximately 40% of the fixture height. In some embodiments, the distance between the third socket 44*c* and the lower end 30 of the strut 22 is between approximately 25% and approximately 35% of the fixture height. In some embodiments, the distance between the third socket 44*c* and the lower end 30 of the strut 22 is approximately 27.4% of the fixture height.

The sockets 44*a*, 44*b*, 44*c* are also angularly offset from one another about the axis 34. In some embodiments, a first angle 90 between a center of the light module in the first socket 44*a* and a center of the light module 42 in the third socket 44*c* is between approximately 20 degrees and approximately 40 degrees about the fixture axis 34. In some embodiments, the first angle 90 is between approximately 25 degrees and approximately 35 degrees about the fixture axis 34. In some embodiments, the first angle 90 is approximately 30 degrees about the fixture axis 34.

In some embodiments, a second angle 92 between a center of the light module in the first socket 44*a* and a center of the light module 42 in the second socket 44*b* is between approximately 35 degrees and approximately 75 degrees about the fixture axis 34. In some embodiments, the second angle 92 is between approximately 50 degrees and approximately 60 degrees about the fixture axis 34. In some embodiments, the second angle 92 is approximately 56 degrees about the fixture axis 34.

In some embodiments, a third angle 94 between a center of the light module in the second socket 44*b* and a center of the light module 42 in the third socket 44*c* is between approximately 15 degrees and approximately 35 degrees about the fixture axis 34. In some embodiments, the third angle 94 is between approximately 20 degrees and approximately 30 degrees about the fixture axis 34. In some embodiments, the third angle 94 is approximately 26 degrees about the fixture axis 34.

In the illustrated embodiment, the fixture includes four struts 22 equally spaced apart from one another about the axis 34. As a result, the first socket 44*a* of one strut 22 is spaced apart from a first socket 44*a* of an adjacent strut by approximately 90 degrees. In other embodiments, the fixture may include fewer or more struts 22, and the corresponding angle between each first socket 44*a* could be more or less than 90 degrees. In addition, in some embodiments the struts 22 may not be identical or may be asymmetric about the axis 34, such that an angle between sockets 44 on each strut 22 is unequal.

In the illustrated embodiment, the sockets 44*a*, 44*b*, and 44*c* are radially offset from one another with respect to the axis 34. A radial offset distance between the first socket 44*a* and the fixture axis 34 is less than a radial offset distance between the second socket 44*b* and the axis 34, and is also less than a radial offset distance between the third socket 44*c* and the axis 34. In the illustrated embodiment, the radial offset distance of the second socket 44*b* is approximately the same as the radial offset distance of the third socket 44*c*. In other embodiments, the radial offset distance of the second socket 44*b* and the radial offset distance of the third socket 44*c* may be different.

In some embodiments, a radial offset distance between the center of the module 42 in the first socket 44*a* and the fixture axis 34 is between approximately 50% and approximately 70% of the maximum fixture radius. In some embodiments, the radial offset distance between the center of the module 42 in the first socket 44*a* and the fixture axis 34 is between approximately 55% and approximately 65% of the maximum fixture radius. In some embodiments, the radial offset distance between the center of the module 42 in the first socket 44*a* and the fixture axis 34 is approximately 62.5% of the maximum fixture radius.

In some embodiments, a radial offset distance between the center of the module 42 in the second socket 44*b* and the fixture axis 34 is between approximately 70% and approximately 90% of the maximum fixture radius. In some embodiments, the radial offset distance between the center of the module 42 in the second socket 44*b* and the fixture axis 34 is between approximately 75% and approximately 85% of the maximum fixture radius. In some embodiments, the radial offset distance between the center of the module 42 in the second socket 44*b* and the fixture axis 34 is approximately 81.3% of the maximum fixture radius.

In some embodiments, a radial offset distance between the center of the module 42 in the third socket 44*c* and the fixture axis 34 is between approximately 70% and approximately 90% of the maximum fixture radius. In some embodiments, the radial offset distance between the center of the module 42 in the third socket 44*c* and the fixture axis 34 is between approximately 75% and approximately 85% of the maximum fixture radius. In some embodiments, the radial offset distance between the center of the module 42 in the third socket 44*c* and the fixture axis 34 is approximately 81.3% of the maximum fixture radius.

Each light module 42 is positioned within an individual socket 44. As a result, light is emitted from the fixture 10 from multiple planes, and the plane of emitted light from one of the sockets 44*a*, 44*b*, 44*c* is axially offset from the plane of emitted light from another of the sockets 44*a*, 44*b*, 44*c*. As shown in FIG. 7, each socket 44 includes an upper surface 62 and a lip or ridge 66, and the upper surface 62 is recessed with respect to the ridge 66. Stated another way, the ridge 66 extends axially below the upper surface 62. The light emitted by the light module 42 is directed at an angle below a horizontal plane 70 so that no light is emitted in an upward direction. In addition, no light is emitted in a plane that is perpendicular to the fixture axis 34 (i.e., parallel to the ground). In some embodiments, a peak angle 102 of the emitted light relative to the fixture axis 34 is between approximately 45 degrees and 75 degrees relative to the fixture axis 34. In some embodiments, the peak angle 102 of the emitted light is between approximately 60 degrees and 70 degrees relative to the fixture axis 34. In some embodiments, the peak angle 102 of the emitted light is approximately 65 degrees relative to the fixture axis 34.

As shown in FIG. 8, the modules 42 may be oriented to emit light is a different direction from one another. In the illustrated embodiment, the module 42*a* in the first socket 44*a* emits light in a first direction 82*a* that is substantially perpendicular to the fixture axis 34, while the module 42*c* in the third socket 44*c* emits light in a third direction 82*c* that is substantially perpendicular to the first direction 82*a*. The module 42*b* in the second socket 44*b* emits light in a second direction 82*b* that is oriented at an angle with respect to both the first direction 82*a* and the third direction 82*c*. The arrows 82*a*, 82*b*, and 82*c* may represent a horizontal output range for the emitted light. Due to the multiple directions for the emitted light, the total light distribution is asymmetric about the fixture axis 34. In some embodiments, each light module 22 may be independently pivoted or adjusted relative to the fixture 10 to change the direction of the emitted light. An example of such a light module 22 is described in the Appendix.

In some embodiments, an angle extending between the first direction 82*a* and the third direction 82*c* is between approximately 75 degrees and 105 degrees. In some embodiments, the angle extending between the first direction 82*a* and the third direction 82*c* is between approximately 80 degrees and 95 degrees. In some embodiments, an angle extending between the first direction 82*a* and the third direction 82*c* is approximately 85 degrees.

In some embodiments, an angle extending between the first direction 82*a* and the second direction 82*b* is between approximately 110 degrees and 150 degrees. In some embodiments, the angle extending between the first direction 82*a* and the second direction 82*b* is between approximately 120 degrees and 140 degrees. In some embodiments, an angle extending between the first direction 82*a* and the second direction 82*b* is approximately 130 degrees.

In some embodiments, an angle extending between the second direction 82*b* and the third direction 82*c* is between approximately 35 degrees and 55 degrees. In some embodiments, the angle extending between the second direction 82*b* and the third direction 82*c* is between approximately 40 degrees and 50 degrees. In some embodiments, an angle extending between the second direction 82*b* and the third direction 82*c* is approximately 45 degrees.

Figure 9:
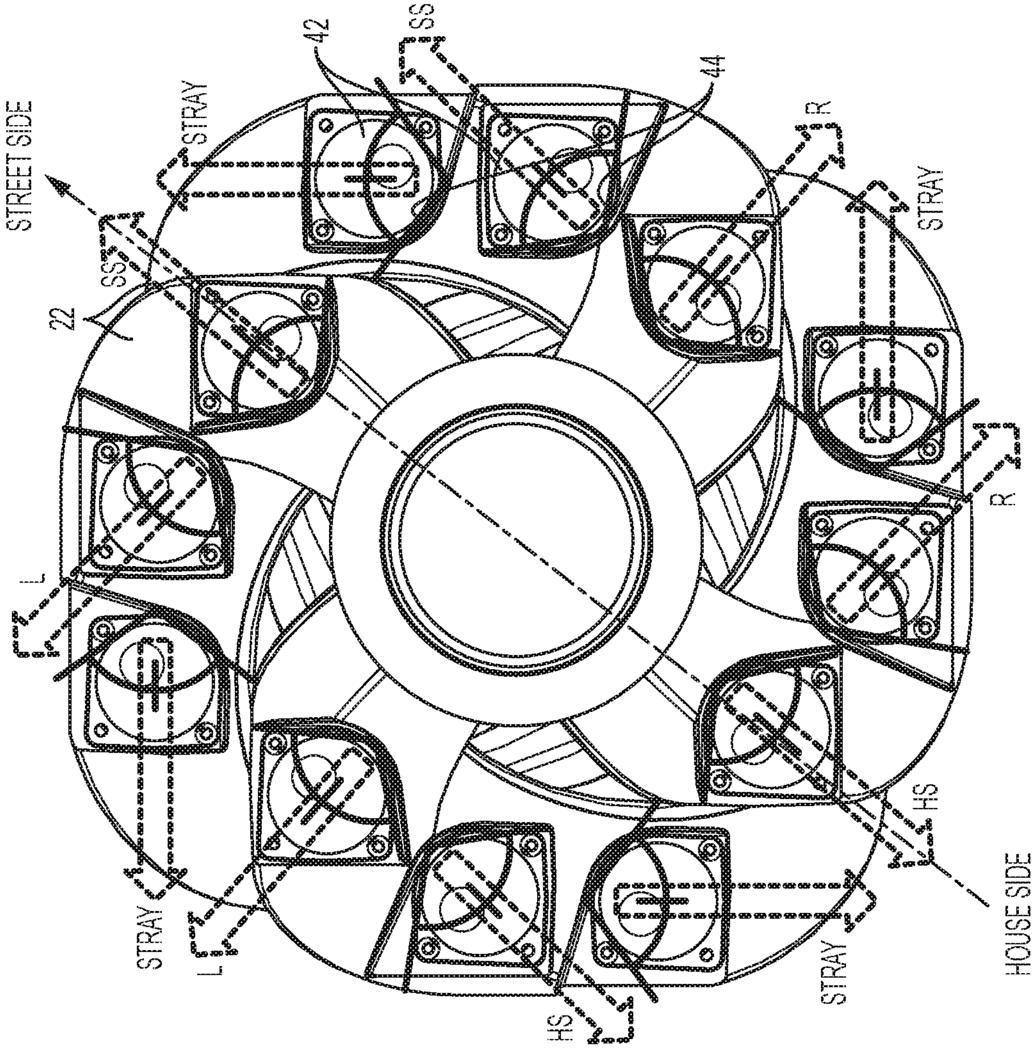
FIG. 9 is a bottom view of the light fixture of FIG. 1 with light-emitting elements in a first configuration.
Figure 10:
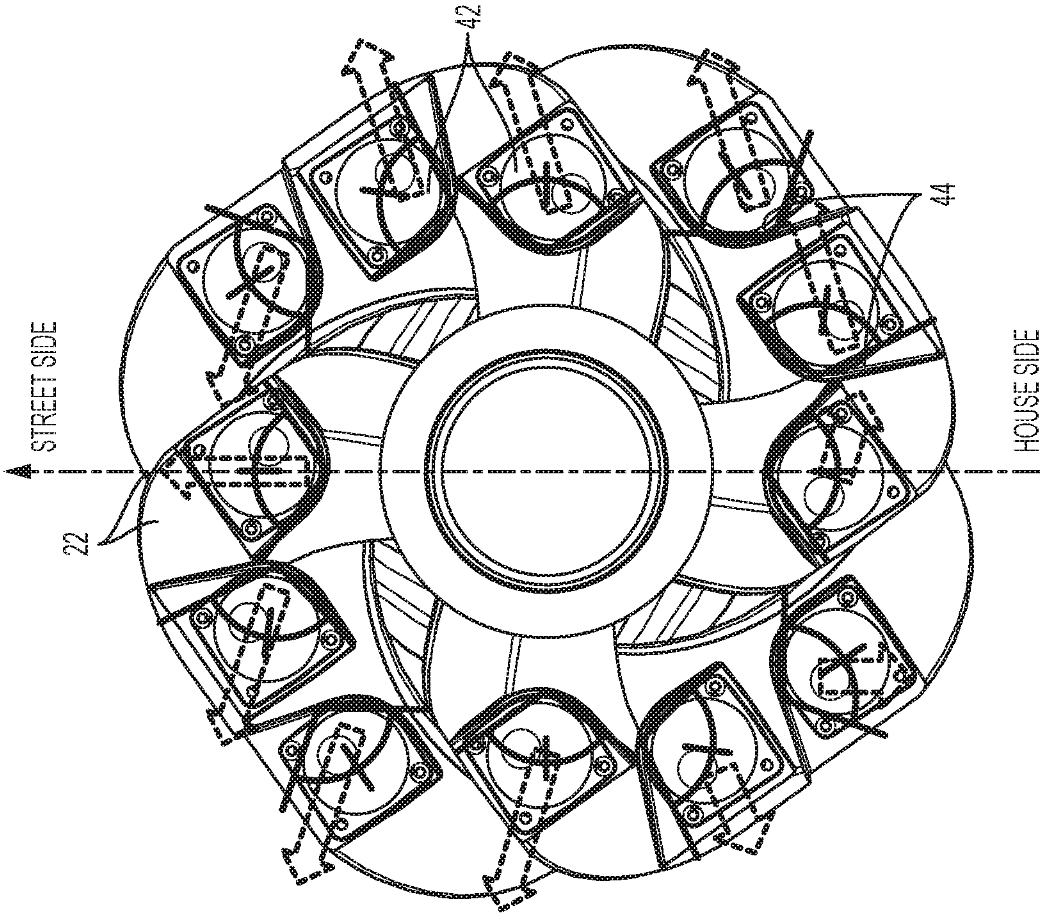
FIG. 10 is a bottom view of a light fixture with light-emitting elements in a second configuration.

FIGS. 9 and 10 illustrate a comparison of two light distribution configurations of the fixture 10 in one application. FIG. 9 shows a “native” output of the fixture 10, with each strut having light modules 42 configured similar to the configuration of FIG. 8. One side of the fixture 10 faces toward a structure (e.g., a house), while an opposite side faces toward a street. FIG. 10 shows a modified configuration in which the base is rotated approximately 38 degrees in a counter-clockwise direction. In addition, the peak angle for the light modules 42 positioned closest to the structure are reduced (i.e., the angle of the emitted light relative to the axis 34 is less than the angle of the emitted light for other modules 42). This is illustrated schematically in that the shorter arrows have a lower peak angle (e.g., for fill light at the nadir) and longer arrows have a higher peak angle for optimal pole spacing. More light is therefore directed toward the ground on the house side. In the illustrated embodiment of FIG. 10, the light distribution is approximately 75% on the house-side of the fixture 10 and approximately 25% on the street side of the fixture 10.

Figure 11E:
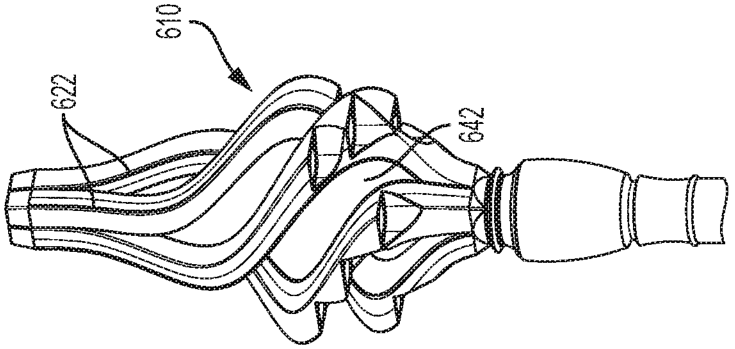
FIG. 11E is a side view of a light fixture according to another embodiment.
Figure 11D:
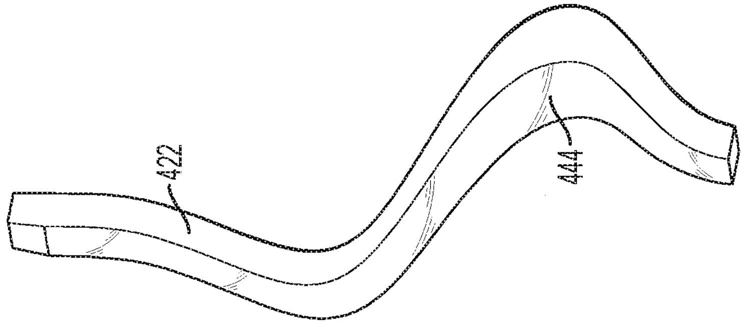
FIG. 11D is a side view of a strut according to another embodiment.
Figure 11C:
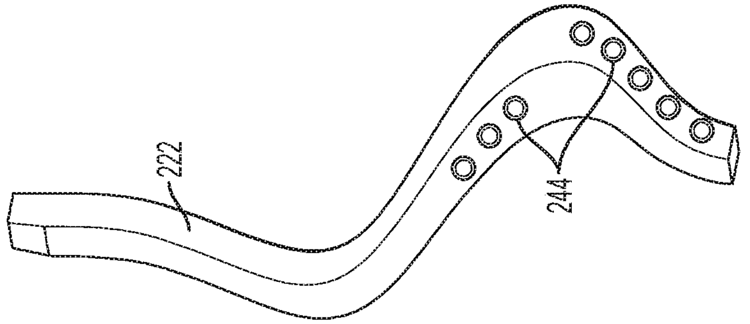
FIG. 11C is a side view of a strut according to another embodiment.
Figure 11B:
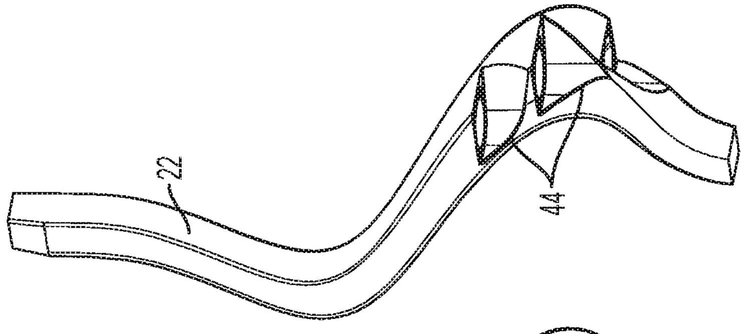
FIG. 11B is a side view of a strut including multiple sockets.
Figure 11A:
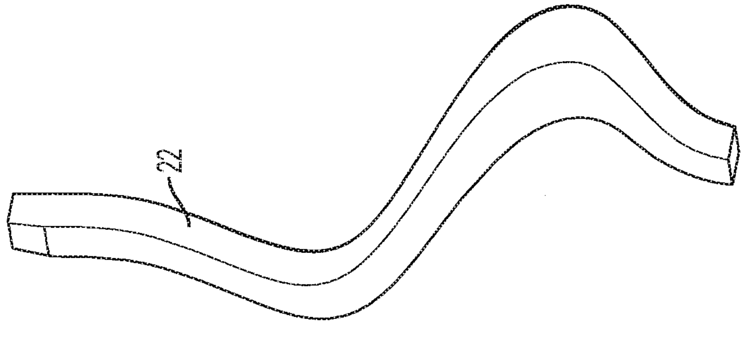
FIG. 11A is a side view of a strut.

FIGS. 11A-11E illustrate various other embodiments of the struts 22. FIG. 11A shows a strut without any surface features or surface treatment. FIG. 11B illustrates the strut 22 with the “scallop”-shaped cutouts or sockets for optics, similar to the sockets 44 described above. FIG. 11C shows a strut 222 including multiple pockets or recesses 244 (instead of scallop-shaped sockets) formed natively on the surfaces of the strut 222, such that the surfaces of the strut 222 are continuous. The recesses 244 may be formed on multiple surfaces of the strut 222. FIG. 11D shows a strut 422 including a lens 444 having a profile matching the contour of the surface of the strut 422. As a result, the surfaces of the strut 422 are continuous. Finally, FIG. 11E shows a fixture 610 in which a globe lens 642 is positioned within the space between the struts 622. The surfaces of each strut 622 may be continuous or un-interrupted, and the width of each strut 622 may be reduced to reduce interference with the light emitted from the globe lens 642.

Although certain aspects have been described in detail with reference to certain preferred embodiments, variations and modifications exist within the scope and spirit of one or more independent aspects as described.

What is claimed is:

1. A light fixture comprising:

at least one elongated strut, each strut including a first end, a second end, and an arcuate portion extending between the first end and the second end, an axis extending between the first end and the second end, the arcuate portion extending at least partially around the axis, wherein the arcuate portion of each strut extends in a helical manner between the first end and the second end;

at least one first socket, the first socket formed on one of the at least one strut and spaced apart from the second end of the strut by a first distance, the first socket supporting a first light-emitting element; and at least one second socket, the second socket formed on one of the at least one strut and spaced apart from the second end of the strut by a second distance greater than the first distance, the second socket supporting a second light-emitting element, the second light-emitting element emitting light from a position that is offset in a direction parallel to the axis from the light emitted by the first light-emitting element, light emitted by the first and second light-emitting elements is generally directed toward the first end.

2. The light fixture of claim 1, wherein the first socket is positioned on a first plane perpendicular to the axis, wherein the second socket is positioned on a second plane perpendicular to the axis and axially offset from the first plane.

3. The light fixture of claim 1, further comprising a third socket formed on each strut and spaced apart from the second end of the strut by a third distance greater than the first distance and less than the second distance, the third socket supporting a third light-emitting element, the third light-emitting element emitting light from a position that is offset along the axis from the light emitted by the first light-emitting element and the second light-emitting element.

4. The light fixture of claim 1, wherein the at least one elongated strut includes four elongated struts, the struts spaced apart from one another about the axis by equal angular intervals.

5. The light fixture of claim 1, wherein the each socket includes a ridge and a surface supporting the respective light-emitting element, the surface being recessed relative to the ridge such that the light emitted by the light-emitting element is directed at an acute angle relative to the axis.

6. The light fixture of claim 1, wherein the first socket is angularly offset from the second socket about the axis.

7. The light fixture of claim 1, wherein the first socket is radially offset from the second socket such that a radial distance between the axis and the first socket is less than a radial distance between the axis and the second socket.

8. The light fixture of claim 1, wherein each socket is formed on a lower portion of the fixture such that the light-emitting elements are oriented downwardly.

9. The light fixture of claim 1, wherein the first light-emitting element is oriented to emit light in a first direction, wherein the second light-emitting element is oriented to emit light in a second direction.

10. A light fixture comprising:

at least one elongated strut, each strut including a first end, a second end, and an arcuate portion extending between the first end and the second end, an axis extending between the first end and the second end, the arcuate portion extending at least partially around the axis, wherein the arcuate portion of each strut extends in a helical manner between the first end and the second end; and a socket formed on an associated one of the at least one strut, the socket including a ridge and a surface supporting a first light-emitting element, the surface oriented in a plane perpendicular to the axis, the surface being recessed relative to the ridge such that the light emitted by the light-emitting element is directed at an acute angle relative to the axis.

11. The light fixture of claim 10, wherein the socket is a first socket, and further comprising a second socket formed on the associated strut, the second socket including a ridge and a surface supporting a second light-emitting element, the surface being recessed relative to the ridge such that the light emitted by the second light-emitting element is directed at an acute angle relative to the axis.

12. The light fixture of claim 11, wherein the second socket is axially spaced apart from the first socket, the second light-emitting element emitting light from a position that is axially offset from the light emitted by the first light-emitting element.

13. The light fixture of claim 11, wherein the plane is a first plane perpendicular to the axis, wherein the second socket is positioned on a second plane perpendicular to the axis and axially offset from the first plane.

14. The light fixture of claim 11, further comprising a third socket formed on the associated strut, the third socket including a ridge and a surface supporting a third light-emitting element, the surface being recessed relative to the ridge such that the light emitted by the third light-emitting element is directed at an acute angle relative to the axis.

15. The light fixture of claim 10, wherein the at least one elongated strut includes four elongated struts, the struts spaced apart from one another about the axis by equal angular intervals.

16. The light fixture of claim 10, wherein the socket is formed on a lower portion of the fixture such that the light-emitting element is oriented downwardly.

17. The light fixture of claim 16, wherein the ridge prevents any light from being emitted in a direction perpendicular to the axis.

18. A light fixture comprising:

at least one elongated strut, each strut including a first end, a second end, and an arcuate portion extending between the first end and the second end, an axis extending between the first end and the second end, the arcuate portion extending at least partially around the axis;

at least one first socket, the first socket formed on one of the at least one strut and spaced apart from the second end of the strut by a first distance, the first socket supporting a first light-emitting element; and at least one second socket, the second socket formed on one of the at least one strut and spaced apart from the second end of the strut by a second distance greater than the first distance, the second socket supporting a second light-emitting element, the second light-emitting element emitting light from a position that is offset in a direction parallel to the axis from the light emitted by the first light-emitting element, light emitted by the first and second light-emitting elements is generally directed toward the first end, wherein the each socket includes a ridge and a surface supporting the respective light-emitting element, the surface being recessed relative to the ridge such that the light emitted by the light-emitting element is directed at an acute angle relative to the axis.

* * * * *